United States Patent [19]

Ohkubo et al.

[11] Patent Number: 5,188,474
[45] Date of Patent: Feb. 23, 1993

[54] YOKE FOR UNIVERSAL JOINT

[75] Inventors: Kiyoshi Ohkubo, Maebashi; Hiroshi Sekine, Takasaki, both of Japan

[73] Assignee: Nippon Seiko Kabushiki Kaisha, Tokyo, Japan

[21] Appl. No.: 681,777

[22] Filed: Apr. 8, 1991

[30] Foreign Application Priority Data

Apr. 12, 1990 [JP] Japan ................ 2-38525[U]

[51] Int. Cl.⁵ ............................................ F16D 3/00
[52] U.S. Cl. ................................ 403/57; 403/157; 403/290; 403/373; 72/379.2; 464/134
[58] Field of Search ............... 403/290, 344, 313, 309, 403/373, 57, 157, 74; 72/379.2; 464/134, 135

[56] References Cited

U.S. PATENT DOCUMENTS

| | | | |
|---|---|---|---|
| 1,785,870 | 12/1930 | Marles | 403/313 |
| 2,227,648 | 1/1941 | Hufferd | 403/309 |
| 3,867,050 | 2/1975 | Pitner | 403/373 |
| 4,361,024 | 11/1982 | Haldric | 72/379.2 |
| 4,505,608 | 3/1985 | Haldric | 403/13 |
| 4,646,552 | 3/1987 | Kanbe | 72/379.2 |

FOREIGN PATENT DOCUMENTS 0195544 12/1982 Japan ................ 72/379.2
2-35223 2/1990 Japan .

*Primary Examiner*—Peter M. Cuomo
*Attorney, Agent, or Firm*—Shapiro and Shapiro

[57] ABSTRACT

A universal joint yoke comprises: (a) a generally cylindrical connecting part made by press-forming a metal plate and having internal peripheral serrations, a first end portion at which edges of the metal plate are brought into abutment to form a tubular abutting part, a second end portion with a pair of flanges disposed at opposite sides of an axial gap and facing one another substantially in parallel, and a pair of reentrant cut-outs with a respective one of the cut-outs being disposed between each flange and the abutting part, and (b) a pair of diametrically opposed connecting arms integrally formed with the first end portion of the connecting part and extending axially outwardly from the first end portion of the connecting part. One of the flanges is provided with a tapped hole and the other of the flanges is provided with a through-hole coaxial with the tapered hole for passing a bolt to be screwed into the tapped hole. Each connecting arm is provided with a respective through-hole, and the respective through-holes of the connecting arms are coaxial.

3 Claims, 4 Drawing Sheets

YOKE FOR UNIVERSAL JOINT

BACKGROUND OF THE INVENTION

1. Field of the Invention

The present invention relates to a yoke of a universal joint used, for instance, in an automobile steering device for transmitting the movement of a steering wheel shaft to a steering gear.

2. Related Background Art

An automobile steering device is configured, for example, as shown in FIG. 11.

In the figure, 1 is a steering wheel. The movement of the steering wheel 1 is transmitted to a steering gear 4 through a steering wheel shaft 2 and a coupling rod 3. Thus the steering gear 4 steers the wheels.

Normally, the above-mentioned steering wheel shaft 2 and an input shaft 5 of the steering gear 4 cannot be provided on the same straight line. For this reason, the coupling rod 3 is conventionally provided between the aforementioned shafts 2 and 5 to achieve power transmission between the steering wheel shaft 2 and the input shaft 5 by connecting both ends of the coupling rod 3 with the ends of the steering wheel shaft 2 and the input shaft 5 through a pair of universal joints 6 and 6.

The universal joint 6 incorporated in such power transmitting mechanism is conventionally comprised of first and second yokes 7 and 8, each having a forked shape, and a cross shaft 9 for freely linking both yokes 7 and 8 as shown in FIG. 12.

Because of the structure of the section to which the aforementioned universal joint 6 is attached or because of other assembly requirements, there are some cases where a distance shown by "e" in FIG. 12 between the center of the cross shaft 9 and the center of a bolt 10 for fixing the yoke 8 onto the coupling rod 3 or a similar component must be increased.

For such cases, a yoke 11 shown in FIGS. 13 through 16 was produced according to the manufacturing method disclosed in the Japanese Patent application Laid-Open No. 2-35223, and the yoke 11 was attached to the universal joint 6 shown in FIG. 12 in place of the yoke 8.

The yoke 11 is made by press-forming a thick metal plate to obtain adequate rigidity. It has a connecting cylinder part 13 with a gap 12 formed along the full length and with serrations 14 formed in the inside periphery. It also comprises a pair of flanges 15 and 16 with the gap 12 between them at the lower part of the connecting cylinder part 13 (the bottom part shown in FIGS. 13 and 14). Each of the flanges 15 and 16 is formed to have an adequate thickness by folding a part of a metal plate at an angle of 180 degrees. One flange 15 has a tapped hole 17 for screwing the bolt 10, and the other flange 16 has a through hole 18 for inserting the bolt 10, the two holes being coaxial.

When the end of the coupling rod 3 or a similar part is to be connected and fixed within the yoke 11 which has a structure described above and which is assembled to the cross shaft 9 and another yoke 7 to constitute the universal joint 6, the end of the coupling rod 3 is inserted in the connecting cylinder 13 with the bolt 10 kept in a loose condition so that a serrated part formed on the outside periphery of the rod end is engaged with the serrations 14 formed in the inside periphery of the connecting cylinder part 13. Then the coupling rod 3 and the yoke 11 are connected securely by tightening the bolt 10.

The conventional universal joint yoke which has the structure described above is perhaps most notably disadvantageous with regard to its weight and its rigidity against twisting forces.

Specifically, in the conventional yoke 11, the gap 12 is formed along the full length of the long connecting cylinder part 13, and the part of the metal plate is folded back 180 degrees on either side of the gap 12 to form the thick yoke to provide improved rigidity. This means extra metal material used, adding to the weight of the yoke.

Also, since the gap 12 is formed along the full length of the connecting cylinder part 13, the yoke does not necessarily provide adequate rigidity against twisting forces despite the thickness provided on either side of the gap 12. Thus the rigidity may be insufficient for conveying the rotational power through the universal joint 6 incorporating the yoke 11, resulting in poor steering operation of a steering device which incorporates the universal joint 6.

SUMMARY OF THE INVENTION

A principal object of the present invention is to provide a universal joint yoke which is light-weight and yet highly rigid.

To achieve this object, a universal joint yoke according to the present invention may comprise: (a) a generally cylindrical connecting part made by press-forming a metal plate and having internal peripheral serrations, a first end portion at which edges of the metal plate are brought into abutment to form a tubular abutting part, a second end portion with a pair of flanges disposed at opposite sides of an axial gap and facing one another substantially in parallel, and a pair of reentrant cut-outs with a respective one of the cut-outs being disposed between each flange and the abutting part, and (b) a pair of diametrically opposed connecting arms integrally formed with the first end portion of the connecting part and extending axially outwardly from the first end portion of the connecting part. One of the flanges is provided with a tapped hole and the other of the flanges is provided with a through-hole coaxial with the tapped hole for passing a bolt to be screwed into the tapped hole. Each connecting arm is provided with a respective through-hole, and the respective through-holes of the connecting arms are coaxial.

Notably, in the above-described construction according to the present invention, the abutting part provided at the first end portion of the connecting part makes it possible to reduce the amount of metal used, with a resultant reduction in weight. The abutting part also improves the rigidity against twisting forces.

BRIEF DESCRIPTION OF THE DRAWINGS

FIG. 1 is a side view, FIG. 2 is a sectional view of 2—2 of FIG. 1, FIG. 3 is a view observed from the bottom in FIG. 1, FIG. 4 is a sectional view of 4—4 of FIG. 1, and FIG. 5 is a sectional view of 5—5 of FIG. 1.

FIG. 6 is a side view, FIG. 7 is a sectional view of 7—7 of FIG. 6, FIG. 8 is a view observed from the bottom in FIG. 6, FIG. 9 is a sectional view of 9—9 of FIG. 6, FIG. 10 is a sectional view of 10—10 of FIG. 6.

FIG. 13 is a side view, FIG. 14 is a sectional view of 14—14 of FIG. 13, FIG. 15 is a view observed from the bottom in FIG. 13, and FIG. 16 is a sectional view of 16—16 of FIG. 13.

DETAILED DESCRIPTION OF THE PREFERRED EMBODIMENTS

Figure 1:
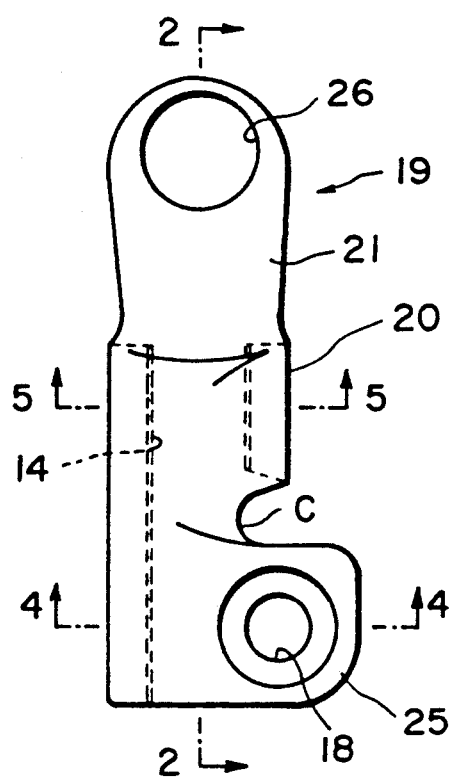
FIGS. 1 through 5 shown an embodiment of the present invention.

The present invention will now be described in detail, referring to the embodiments shown in the drawings.

Figure 2:
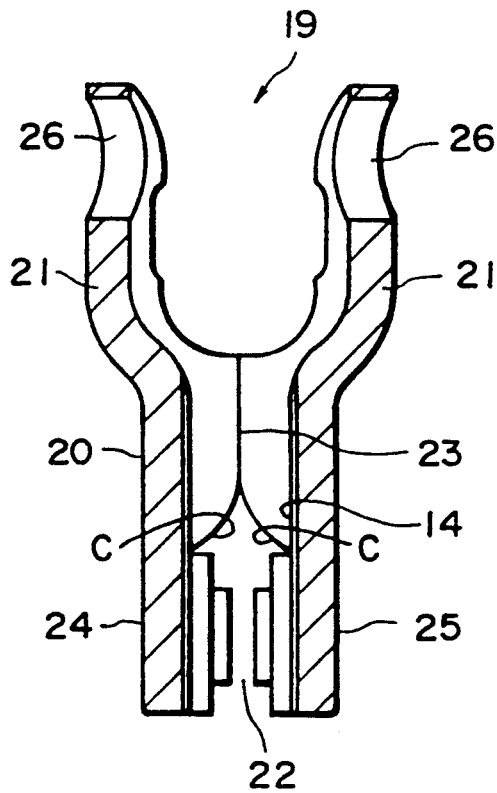
Figure 3:
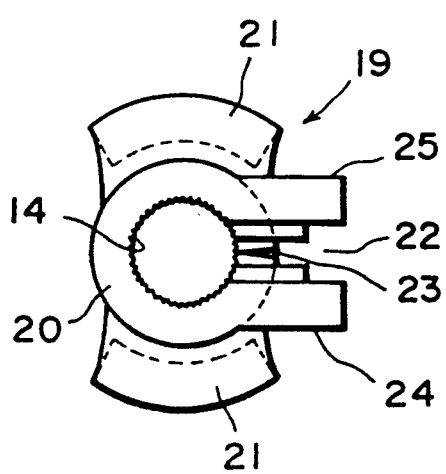
Figure 4:
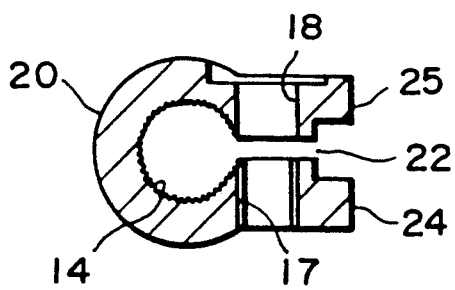
Figure 5:
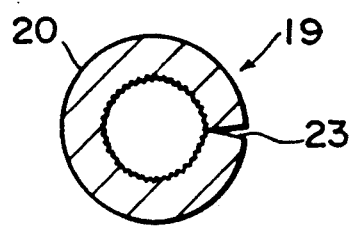
Figure 6:
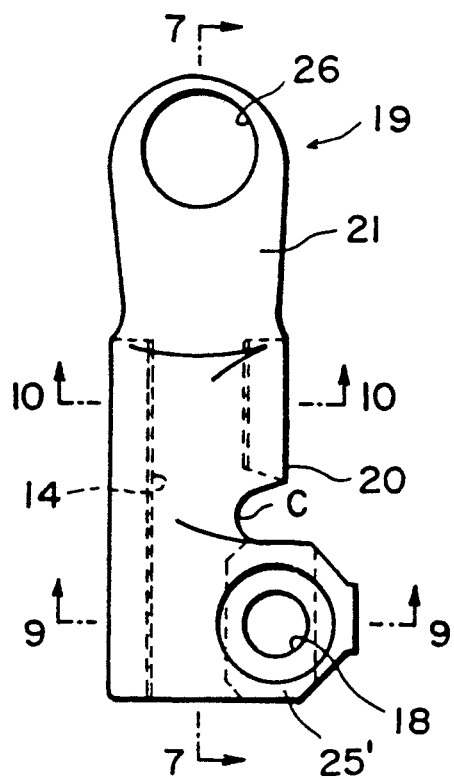
FIGS. 6 through 10 show another embodiment of the present invention.
Figure 7:
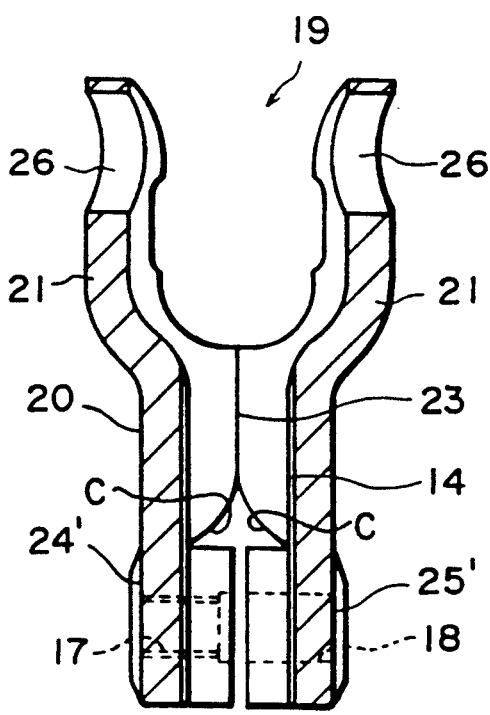
Figure 8:
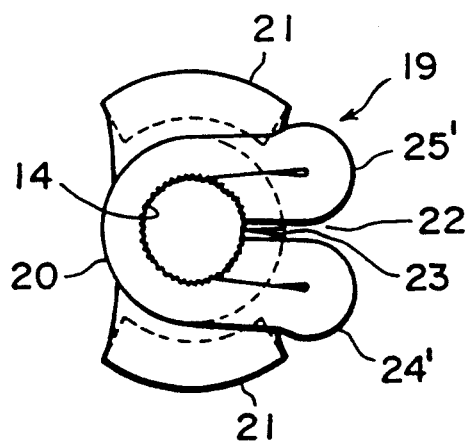
Figure 9:
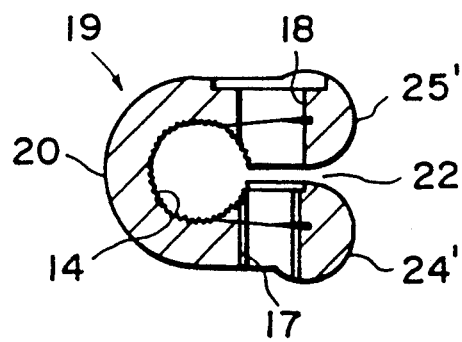
Figure 10:
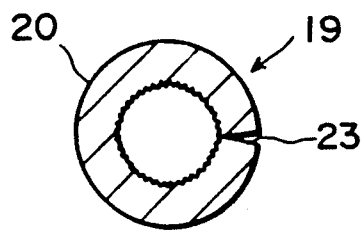

FIGS. 1 through 5 show a first embodiment according to the present invention. In the form shown, a yoke 19 is made by press-forming a metal plate such as a carbon steel plate that has sufficient rigidity. The yoke is provided with a pair of connecting arms 21 and 21 which extend from a first end (the top end as shown in FIGS. 1 and 2) of a tubular connecting cylinder part 20.

The connecting cylinder part 20 has a gap 22 toward its second end (the lower end as shown in FIGS. 1 and 2) to allow the inside diameter of that part to be flexibly reduced.

The first or top end portion of the connecting cylinder part 20 is provided with an abutting part 23 instead of a gap. The abutting part is formed by bringing the edges of the metal plate into abutment with each other as shown, whereby the top end portion of the connecting cylinder part is of a tubular configuration. The inside peripheral surface of the connecting cylinder part 20 is serrated, as shown at 14.

Further, at the second or bottom end portion of the connecting cylinder part 20, a pair of flanges 24 and 25 are formed integral with the connecting cylinder part 20 with the gap 22 between them. Between the abutting part 23 and each of the flanges 24 and 25, the connecting cylinder part 20 has a respective reentrant cut-out C, as seen in FIGS. 1 and 2.

Figure 12:
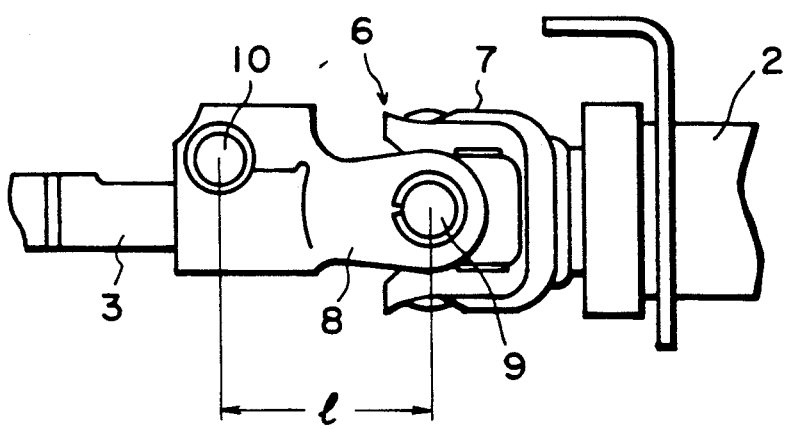
FIG. 12 is an enlarged view of the universal joint in FIG. 11.
Figure 13:
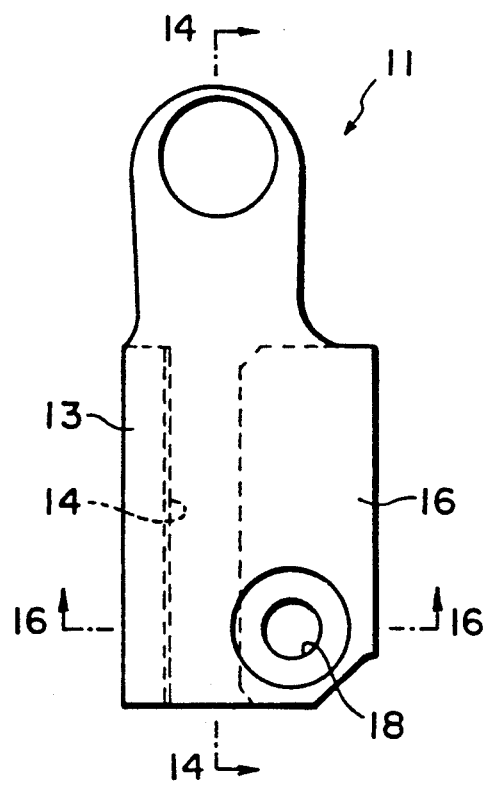
FIGS. 13 through 16 show the yoke of a conventional universal joint, in which drawings
Figure 14:
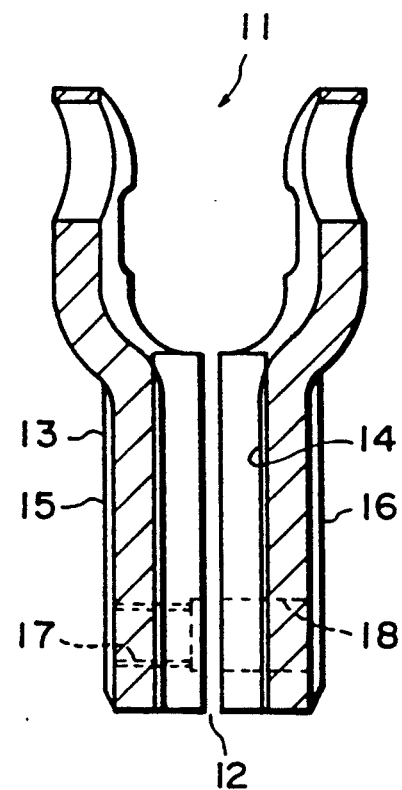
Figure 15:
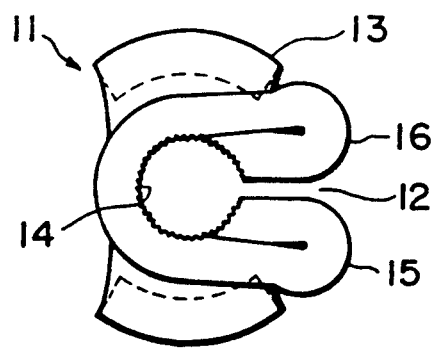
Figure 16:
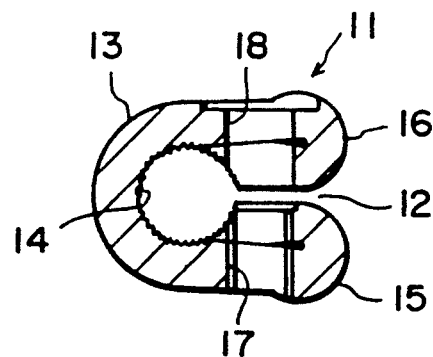

Each of the flanges 24 and 25 is formed to be thickened by adding the extra metal from a part of the metal plate which constitutes the connecting cylinder part 20. One flange 24 (the lower one in FIG. 4) has a tapped hole 17, and the other flange 25 (the upper one in FIG. 4) has a through hole 18, both holes being provided at a right angle to their flange surfaces. The tapped hole 17 and the through hole 18 are coaxial, and the inside diameter of the through hole 18 is made sufficiently larger than the inside diameter of the tapped hole 17 (but smaller than the head of the bolt 10) so that the end of the bolt 10 (FIG. 12) passes through the through hole 18 and engages in the tapped hole 17.

At the top end of the connecting cylinder part 20, the pair of connecting arms 21 and 21 are provided in diametrically opposite positions. The connecting arms 21 and 21 have coaxial round holes 26 and 26 in their end parts.

Figure 11:
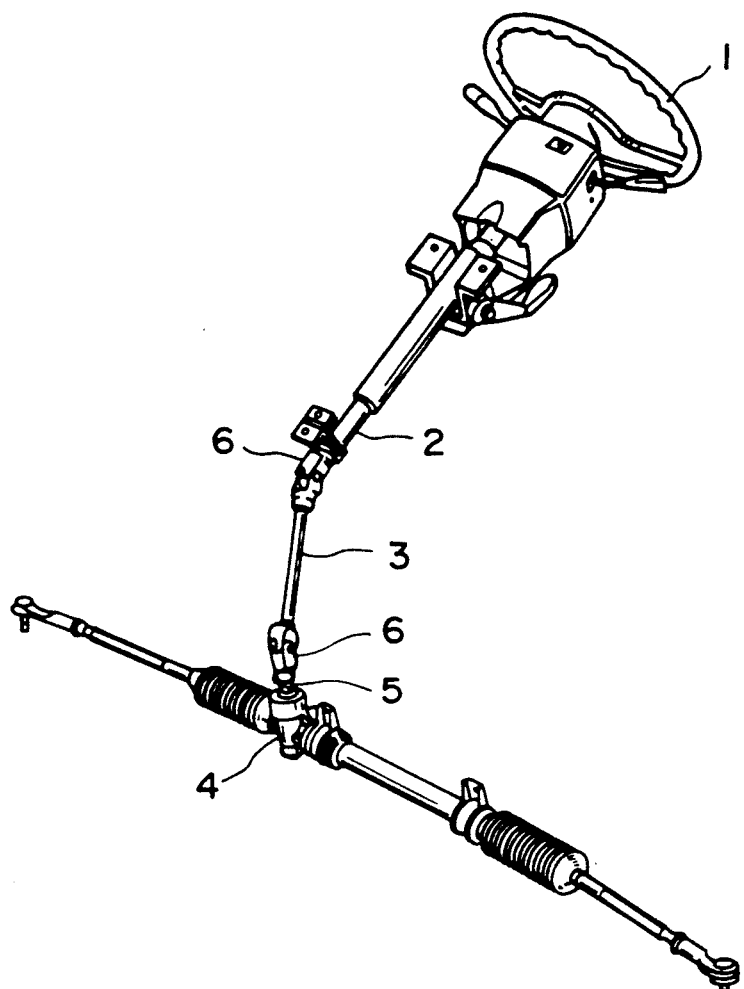
FIG. 11 is a perspective illustration of a steering device which incorporates the universal joint.

When connecting the end of the coupling rod 3 (FIGS. 11 and 12) or a similar component to the yoke 19 described above, the serrated part formed at the end of the coupling rod 3 is inserted in the connecting cylinder part 20 of the yoke. Then the bolt 10 is inserted from the upper direction in FIG. 4 in the through hole 18 provided in the flange 25 and into the tapped hole 17 provided in the flange 24, and the bolt 10 is tightened. This causes the yoke 19 and the end of the coupling rod 3 or the similar component to be securely connected.

In the universal joint yoke 19 according to the present invention, which has a structure explained above and which is used as described above, the abutting part 23 is provided at the upper part of the connecting cylinder part 20 to eliminate the folding part of the metal plate. This reduces the amount of the metal plate used, with a resultant reduction in weight.

In addition, the abutting part 23, adjacent to the cutouts C, very effectively bears twisting forces applied to the pair of connecting arms 21 and 21, thereby improving the rigidity against twisting forces. This enhances the rigidity of a steering device incorporating a universal joint with the yoke 19. The abutting part 23 may be welded if necessary for even higher rigidity.

FIGS. 6 through 10 show a second embodiment of the present invention.

While a part of the metal plate constituting the connecting cylinder part 20 was given an extra thickness to produce a pair of thick flanges 24 and 25 in the first embodiment, in the present embodiment, parts of the metal plate constituting the connecting cylinder part 20 is folded back 180 degrees to produce the pair of thick flanges 24' and 25'.

Other structures and functions are the same as with the first embodiment previously explained.

The universal joint yoke according to the present invention is comprised and used as described above. It is light-weight and provides high rigidity against twisting force. Therefore, it helps improve the quality of a device such as a steering device which incorporates a universal joint.

What is claimed is:

1. A universal joint yoke comprising:
a generally cylindrical connecting part made by press-forming a metal plate and having internal peripheral serrations, a first end portion at which edges of the metal plate are brought into abutment to form a tubular abutting part, a second end portion with a pair of flanges disposed at opposite sides of an axial gap and facing one another substantially in parallel, and a pair of reentrant cut-outs with a respective one of said cut-outs being disposed between each flange and said abutting part, and
a pair of diametrically opposed connecting arms integrally formed with said first end portion of said connecting part and extending axially outwardly from said first end portion of said connecting part, and
wherein one of said flanges is provided with a tapped hole and the other of said flanges is provided with a through-hole coaxial with said tapped hole for passing a bolt to be screwed into said tapped hole, and each connecting arm is provided with a respective through-hole, with the respective through-holes of said connecting arms being coaxial.

2. A universal joint yoke according to claim 1, wherein the portions of said metal plate constituting said flanges are of increased initial thickness.

3. A universal joint yoke according to claim 1, wherein said flanges are formed by portions of said metal plate folded back 180° to provide an increased thickness.

* * * * *